US012607847B2

(12) United States Patent     (10) Patent No.:   US 12,607,847 B2

Zhou     (45) Date of Patent:    Apr. 21, 2026

(54) OPTICAL STRUCTURE AND METHOD FOR MANUFACTURING OPTICAL STRUCTURE

(71) Applicants: BEIJING BOE TECHNOLOGY DEVELOPMENT CO., LTD., Beijing (CN); BOE TECHNOLOGY GROUP CO., LTD., Beijing (CN)

(72) Inventor: Jian Zhou, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 332 days.

(21) Appl. No.: 18/262,265

(22) PCT Filed: Jul. 25, 2022

(86) PCT No.: PCT/CN2022/107613

§ 371 (c)(1),
(2) Date: Jul. 20, 2023

(87) PCT Pub. No.: WO2024/020721

PCT Pub. Date: Feb. 1, 2024

(65) Prior Publication Data

US 2024/0402484 A1     Dec. 5, 2024

(51) Int. Cl.
*G02B 27/00*     (2006.01)
*G02B 1/10*     (2015.01)

(52) U.S. Cl.
CPC ........... *G02B 27/0006* (2013.01); *G02B 1/10* (2013.01)

(58) Field of Classification Search
None
See application file for complete search history.

(56) References Cited

U.S. PATENT DOCUMENTS

| | | | |
|---|---|---|---|
| 6,150,754 | A | 11/2000 | Yoshikawa et al. |
| 2010/0265206 | A1 | 10/2010 | Chen |
| 2014/0103351 | A1 | 4/2014 | Liu et al. |
| 2015/0077361 | A1 | 3/2015 | Seo et al. |
| 2016/0254287 | A1 | 9/2016 | Wang et al. |

(Continued)

FOREIGN PATENT DOCUMENTS

| | | |
|---|---|---|
| CN | 103235660 A | 8/2013 |
| CN | 103744571 A | 4/2014 |

(Continued)

*Primary Examiner* — Phu Vu

(74) *Attorney, Agent, or Firm* — Raj S. Davé; Davé Law Group, LLC

(57) ABSTRACT

The disclosure relates to an optical structure and a method for manufacturing an optical structure. The optical structure includes: a substrate layer; a first isolation layer on the substrate layer and having a first opening on a side away from the substrate layer; a second isolation layer on the first isolation layer and having a second opening on a side away from the substrate layer, wherein a projection of the first opening on the substrate layer overlaps at least partially with a projection of the second opening on the substrate layer, and wherein a ratio of a refractive index of the first isolation layer to a refractive index of the second isolation layer is in a range of 0.95 and 1.05; and a first conductive portion in the second isolation layer and filling at least the second opening.

18 Claims, 16 Drawing Sheets

(56)                References Cited

U.S. PATENT DOCUMENTS

| | | | |
|---|---|---|---|
| 2017/0294456 A1 | 10/2017 | Lee et al. | |
| 2018/0046005 A1 | 2/2018 | Yoon et al. | |
| 2019/0165033 A1 | 5/2019 | Wang et al. | |
| 2019/0333944 A1 | 10/2019 | Xiao et al. | |
| 2021/0034198 A1 | 2/2021 | Wang et al. | |
| 2021/0400807 A1* | 12/2021 | Zhou | B05D 5/12 |
| 2022/0069027 A1 | 3/2022 | Wang et al. | |

FOREIGN PATENT DOCUMENTS

| | | | |
|---|---|---|---|
| CN | 203659457 U | 6/2014 |
| CN | 103902115 A | 7/2014 |
| CN | 104218094 A | 12/2014 |
| CN | 204155234 U | 2/2015 |
| CN | 105045455 A | 11/2015 |
| CN | 105045456 A | 11/2015 |
| CN | 107452749 A | 12/2017 |
| CN | 107705883 A | 2/2018 |
| CN | 106856107 B | 4/2019 |
| CN | 110021613 A | 7/2019 |
| CN | 110061036 A | 7/2019 |
| CN | 209627738 U | 11/2019 |
| CN | 110970152 A | 4/2020 |
| CN | 111799320 A | 10/2020 |
| CN | 112306277 A | 2/2021 |
| CN | 213182707 U | 5/2021 |
| CN | 113963857 A | 1/2022 |
| CN | 114373771 A | 4/2022 |
| CN | 114628409 A | 6/2022 |
| CN | 114823914 A | 7/2022 |
| JP | 2004355181 A | 12/2004 |
| JP | 2006252886 A | 9/2006 |
| KR | 1020150031917 A | 3/2015 |
| KR | 20150033772 A | 4/2015 |
| WO | 2011013696 A1 | 2/2011 |

* cited by examiner

Without radiation

Energy localization

Perfect absorption

600

A  ←———————————————→ A'

7

8

6

5

9

4

3

2

1

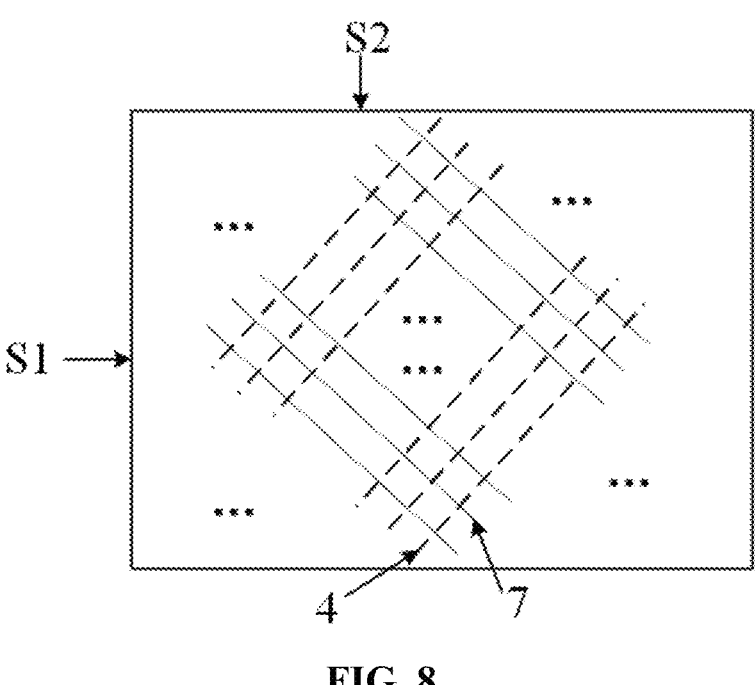
FIG. 8
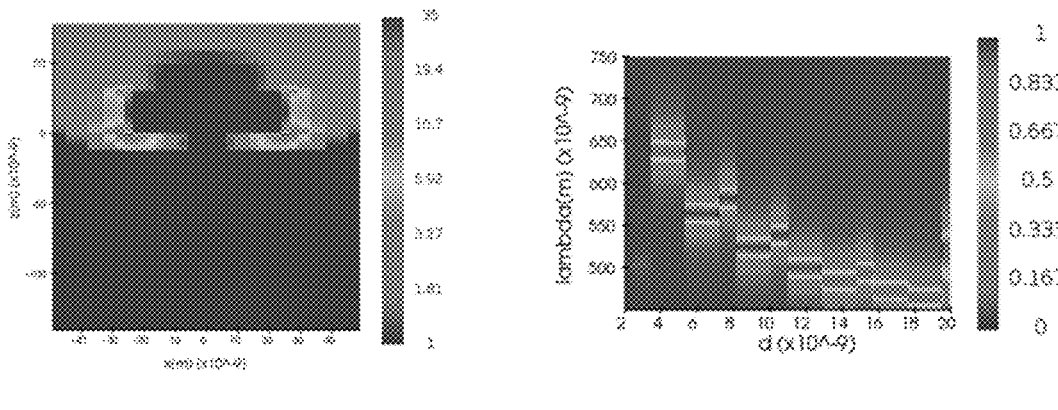
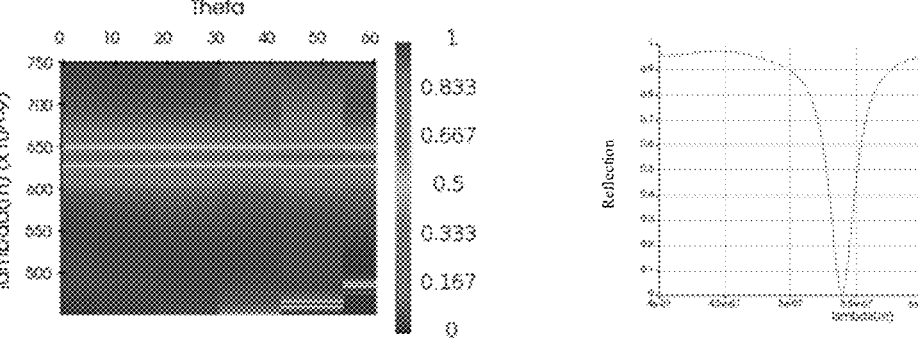
FIG. 9

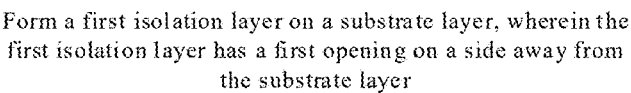

Form a first isolation layer on a substrate layer, wherein the first isolation layer has a first opening on a side away from the substrate layer

↓ form a second isolation layer on the first isolation layer, wherein the second isolation layer has a second opening on a side away from the substrate layer, wherein a projection of the first opening on the substrate layer overlaps at least partially with a projection of the second opening on the substrate layer, and wherein a ratio of the refractive index of the first isolation layer to the refractive index of the second isolation layer is in a range of 0.95 to 1.05

↓

Form, in the second isolation layer, a first conductive layer filling the second opening

FIG. 10

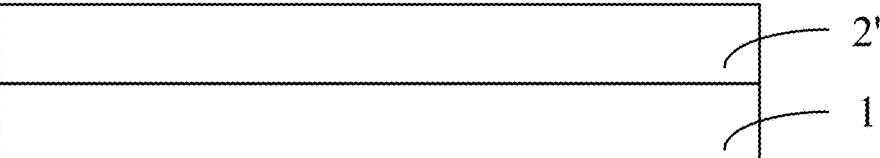

FIG. 11A

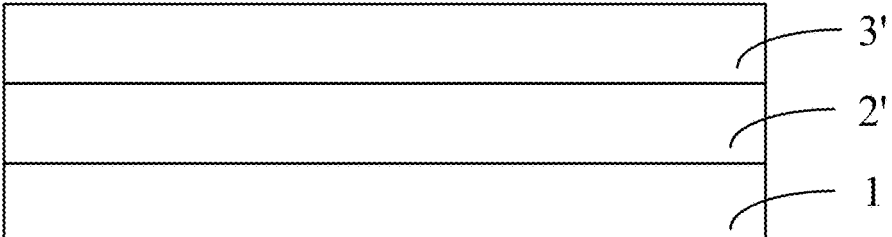

FIG. 11B

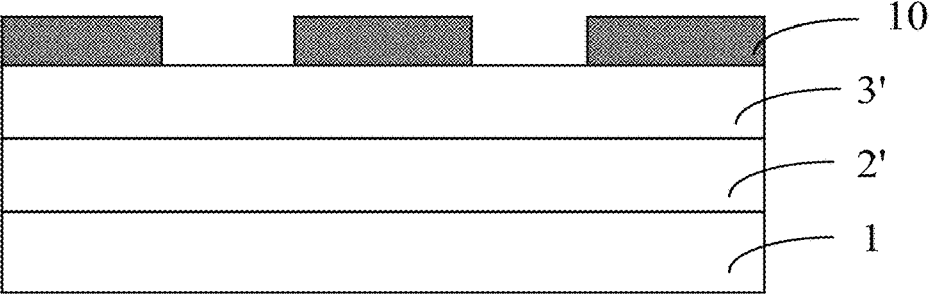

OPTICAL STRUCTURE AND METHOD FOR MANUFACTURING OPTICAL STRUCTURE

CROSS REFERENCE TO RELATED APPLICATIONS

This patent application is a National Stage Entry of PCT/CN2022/107613 filed on Jul. 25, 2022, the disclosure of which is incorporated by reference herein in its entirety as part of the present application.

TECHNICAL FIELD

The present disclosure relates to a field of optics. More specifically, it relates to an optical structure and a method for manufacturing an optical structure.

BACKGROUND

In the Internet + and big data 5G era, wearable devices, foldable devices, smart home devices, education and teaching devices are developing rapidly. The traditional ITO film cannot satisfy requirements on bending, folding applications and its conductivity is not good. Besides, ITO is a non-renewable resource. Therefore, there are opportunities for an alternative technology on ITO.

SUMMARY

Embodiments of the present invention provide an optical structure. The optical structure includes: a substrate layer; a first isolation layer on the substrate layer and having a first opening on a side away from the substrate layer; a second isolation layer on the first isolation layer and having a second opening on a side away from the substrate layer, wherein a projection of the first opening on the substrate layer overlaps at least partially with a projection of the second opening on the substrate layer, and wherein a ratio of a refractive index of the first isolation layer to a refractive index of the second isolation layer is in a range of 0.95 and 1.05; and a first conductive portion in the second isolation layer and filling at least the second opening.

In some embodiments, the ratio of the refractive index of the first isolation layer to the refractive index of the second isolation layer is 1.

In some embodiments, the second isolation layer extends into the first opening of the first isolation layer and covers a surface portion of the first isolation layer exposed by the first opening, and wherein a projection of the second opening on the substrate layer is within a projection of the first opening on the substrate layer.

In some embodiments, the second opening arrives at the first opening, wherein the projection of the second opening on the substrate layer overlaps with the projection of the first opening on the substrate layer, and wherein the first conductive portion further fills the first opening.

In some embodiments, the optical structure further includes: a third isolation layer on the second isolation layer and covers a surface of the first conductive portion away from the substrate layer, wherein the third isolation layer has a third opening; a fourth isolation layer on the third isolation layer and having a fourth opening, wherein a projection of the third opening on the substrate layer overlaps at least partially with a projection of the fourth opening on the substrate layer; and a second conductive portion in the fourth isolation layer and filling at least the fourth opening, wherein a first extension direction of the first conductive portion in a plane parallel to the substrate layer differs from a second extension direction of the second conductive portion in the plane parallel to the substrate layer, and wherein a projection of the first conductive portion on the substrate layer overlaps with a projection of the second conductive portion on the substrate layer.

In some embodiments, the optical structure includes plural first conductive portions; plural first openings and plural second openings corresponding one-to-one to the plural first conductive portions; plural second conductive portions; and plural third openings and plural fourth openings corresponding one-to-one to the plural second conductive portions, wherein the plural first conductive portions are parallel to each other, and wherein the plural second conductive portions are parallel to each other.

In some embodiments, the optical structure further includes nanometallic particles on a side of the second conductive portion away from the substrate layer; and a dielectric elastomer between the first conductive portion and the second conductive portion.

In some embodiments, the substrate layer has a first side and a second side adjacent to the first side, wherein an extension direction of the first side is different from both the first extension direction and the second extension direction, and wherein an extension direction of the second side is different from both the first extension direction and the second extension direction.

In some embodiments, the dielectric elastomer includes at least one of: polyacrylate and silicone rubber; wherein the nanometallic particles includes silver nanoparticles; wherein the substrate layer includes a flexible substrate layer; wherein the first isolation layer includes SOC; and wherein the second isolation layer includes SiON.

In some embodiments, the first conductive portion and the second conductive portion satisfy at least one of: the first conductive portion has a width in a direction parallel to the substrate layer within 1.5 microns; and the second conductive portion has a width in a direction parallel to the substrate layer within 1.5 microns.

In some embodiments, the first opening and the third opening satisfy at least one of: a depth of the first opening is less than a thickness of the first isolation layer; and a depth of the third opening is less than a depth of the third isolation layer.

Some embodiments of the invention provide a method for fabricating an optical structure. The method includes: forming a first isolation layer on a substrate layer, wherein the first isolation layer has a first opening on a side away from the substrate layer; forming a second isolation layer on the first isolation layer, wherein the second isolation layer has a second opening on a side away from the substrate layer, wherein a projection of the first opening on the substrate layer overlaps at least partially with a projection of the second opening on the substrate layer, and wherein a ratio of the refractive index of the first isolation layer to the refractive index of the second isolation layer is in a range of 0.95 to 1.05; and forming, in the second isolation layer, a first conductive layer filling the second opening.

In some embodiments, the ratio of the refractive index of the first isolation layer to the refractive index of the second isolation layer is 1.

In some embodiments, forming the first isolation layer and the second isolation layer includes: forming a first isolation material layer on the substrate layer; forming a second isolation material layer on the first isolation material layer; patterning the first isolation material layer and the second isolation material layer to form the first isolating layer having the first opening and an etched second isolation material layer, wherein the etched second isolation material layer has a retained first sub-part and a first hollowed-out part, a projection of the first hollowed-out part on the substrate layer overlapping with a projection of the first opening on the substrate layer; and growing a second isolation material at least in the first opening to form the second isolation layer.

In some embodiments, growing at least the second isolation material in the first opening includes: using a chemical vapor deposition process to grow the second isolation material.

In some embodiments, forming the first isolation layer and the second isolation layer includes: forming a first isolation material layer on the substrate layer; forming a second isolation material layer on the first isolation material layer; and patterning the first isolation material layer and the second isolation material layer to form the first isolation layer having the first opening and the second isolation layer having the second opening.

In some embodiments, the method further includes: forming a third isolation layer on the second isolation layer, wherein the third isolation layer covers a surface of the first conductive portion away from the substrate layer and has a third opening, and wherein a projection of the third opening on the substrate layer overlaps at least partially with a projection of the fourth opening on the substrate layer; forming a fourth isolation layer on the third isolation layer, the fourth isolation layer having a fourth opening; forming a second conductive portion in the fourth isolation layer, wherein the fourth isolation layer is in the fourth isolation layer and fills at least the fourth opening, wherein a first extension direction of the first conductive portion in a plane parallel to the substrate layer differs from a second extension direction of the second conductive portion in the plane parallel to the substrate layer, and wherein a projection of the first conductive portion on the substrate layer overlaps with a projection of the second conductive portion on the substrate layer.

In some embodiments, forming the third isolation layer and the fourth isolation layer includes one of: (i) forming, on the second isolation layer, a third isolation material layer; forming a fourth isolation material layer on the third isolation material layer; patterning the third isolation material layer and the fourth isolation material layer to form the third isolation material layer having the third opening and an etched fourth isolation material layer, wherein the etched fourth isolation material layer has a retained second sub-part and a second hollowed-out part, and wherein a projection of the second hollowed-out part on the substrate layer overlaps with a projection of the third opening on the substrate layer; and growing a fourth isolation material at least in the third opening to form the fourth isolation layer; or (ii) forming a third isolation material layer on the second isolating layer; forming a fourth isolation material layer on the third isolation material layer; and patterning the third isolation material layer and the fourth isolation material layer to form the third isolation layer having the third opening and the fourth isolation layer having the fourth opening.

In some embodiments, the first opening and the third opening satisfy at least one of: a depth of the first opening is less than a thickness of the first isolation layer; and a depth of the third opening is less than a depth of the third isolation layer.

In some embodiments, the method further includes: forming a dielectric elastomer on the first conductive portion; and forming nanometallic particles on the second conductive portion.

In some embodiments, the substrate layer has a first side and a second side adjacent to the first side, wherein an extension direction of the first side is different from both the first extension direction and the second extension direction, and wherein an extension direction of the second side is different from both the first extension direction and the second extension direction.

In some embodiments, the dielectric elastomer includes at least one of: polyacrylate and silicone rubber; the nanometallic particles includes silver nanoparticles; and the substrate layer includes a flexible substrate layer.

BRIEF DESCRIPTION OF THE DRAWINGS

To describe the technical solutions in the embodiments of the present disclosure more clearly, the accompanying drawings of the embodiments are briefly described below. It should be understood that the drawings described below refer only to some embodiments of the present disclosure, and not to restrict the present disclosure, wherein:

FIG. 8 is a schematic top view of an optical structure according to an embodiment of the present invention;

FIG. 9 is a simulation of the optical characteristics of the optical structure according to an embodiment of the present invention;

FIG. 10 is a schematic flow chart of a method for manufacturing an optical structure according to an embodiment of the present invention;

FIGS. 11A-11L are flow charts of a method for manufacturing an optical structure according to an embodiment of the present invention;

FIG. 14 shows a schematic view of a method for manufacturing an optical structure according to embodiments of the present invention;

DETAILED DESCRIPTION

Figure 1:
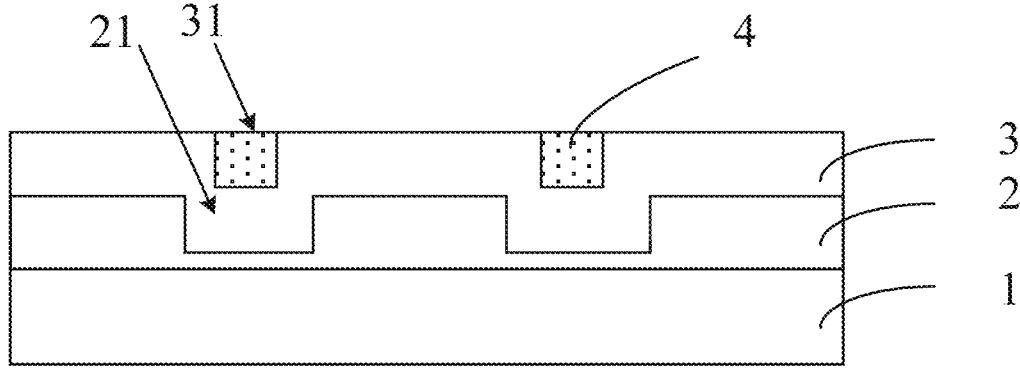
FIG. 1 is a schematic cross-sectional view of an optical structure according to an embodiment of the present invention.

In order to make the objectives, technical solutions and advantages of the embodiments of the present disclosure more comprehensible, the technical solutions of the embodiments of the present disclosure are clearly and completely described below with reference to the accompanying drawings. Obviously, the described embodiments are only a part but not all of the embodiments of the present disclosure. Based on the described embodiments of the present disclosure, all other embodiments obtained by those skilled in the art without creative efforts shall also fall within the protection scope of the present disclosure.

As used herein and in the appended claims, the singular form of a word includes the plural, and vice versa, unless the context clearly dictates otherwise. Thus, the references "a", "an", and "the" are generally inclusive of the plurals of the respective terms. Similarly, the words "comprise", "comprises", and "comprising" are to be interpreted inclusively rather than exclusively.

For purposes of the description, hereinafter, the terms "upper", "lower", "right", "left", "vertical", "horizontal", "top", "bottom", and derivatives thereof shall relate to the disclosure, as it is oriented in the drawing figures. The terms "overlying", "atop", "positioned on" or "positioned atop" means that a first element, such as a first structure, is present on a second element, such as a second structure, wherein intervening elements, such as an interface structure, e.g., interface layer, may be present between the first element and the second element. The term "contact" means that a first element, such as a first structure, and a second element, such as a second structure, are connected with or without any intermediary elements at the interface of the two elements.

FIG. 1 shows a schematic cross-sectional view of an optical structure according to an embodiment of the present invention. As shown in FIG. 1, the optical structure according to an embodiment of the present invention may include: a substrate layer 1, a first isolation layer 2, a second isolation layer 3, and a first conductive portion 4. As shown in FIG. 1, the first isolation layer 2 is on the substrate layer 1 and has a first opening 21 on a side away from the substrate layer. The second isolation layer 3 is on the first isolation layer 2 and has a second opening 31 on a side away from the substrate layer 1. A projection of the first opening 21 on the substrate layer 1 overlaps at least partially with a projection of the second opening 31 on the substrate 1. The ratio of the refractive index of the first isolation layer 2 to the refractive index of the second isolation layer 3 is in a range of 0.95 and 1.05. For example, the ratio may be 0.98 or 1.02. By such a setting, it is possible to achieve a conductive grid (e.g., a metallic grid) with narrow line widths while solving the problem of color streaks caused by refractive index mismatch between the first isolation layer and the second isolation layer when especially being used in the display field, and to solve the problem of limitations of conventional semiconductor processes.

In some embodiments, the ratio of the refractive index of the first isolation layer to the refractive index of the second isolation layer may be about 1. This enables better refractive index matching and better optical results. For example, the first isolation layer may include SOC and the second isolation layer may include SiON.

The second isolation layer 3 may extend into the first opening 21 of the first isolation layer 2 and cover a surface portion of the first isolation layer 2 that is exposed by the first opening, and wherein the projection of the second opening 31 on the substrate layer 1 is within the projection of the first opening 21 on the substrate layer 1. By such a setting, the substrate layer is protected from being damaged during the manufacturing process.

Figure 2:
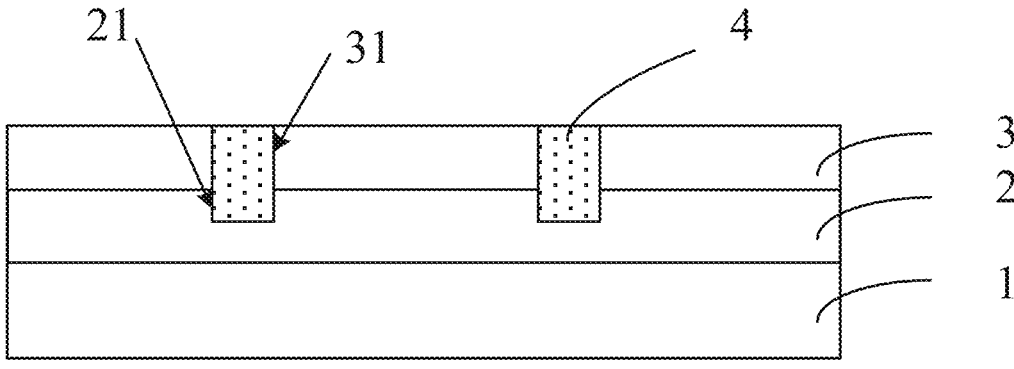
FIG. 2 shows a schematic cross-sectional view of an optical structure according to an embodiment of the present invention.

FIG. 2 shows a schematic cross-sectional view of an optical structure according to an embodiment of the present invention. As shown in FIG. 2, the second opening 31 can arrive at the first opening 21, and the projection of the second opening on the substrate layer 1 overlaps with the projection of the first opening on the substrate layer, and wherein the first conductive portion further fills the first opening.

Figure 3A:
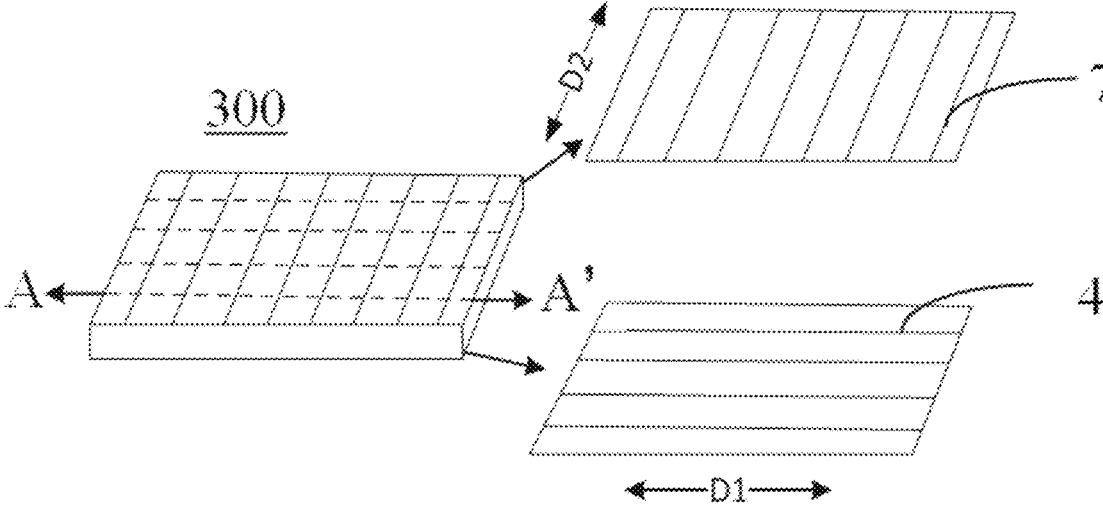
FIGS. 3A-3C are schematic views of an optical structure according to some embodiments of the present invention.
Figure 3B:
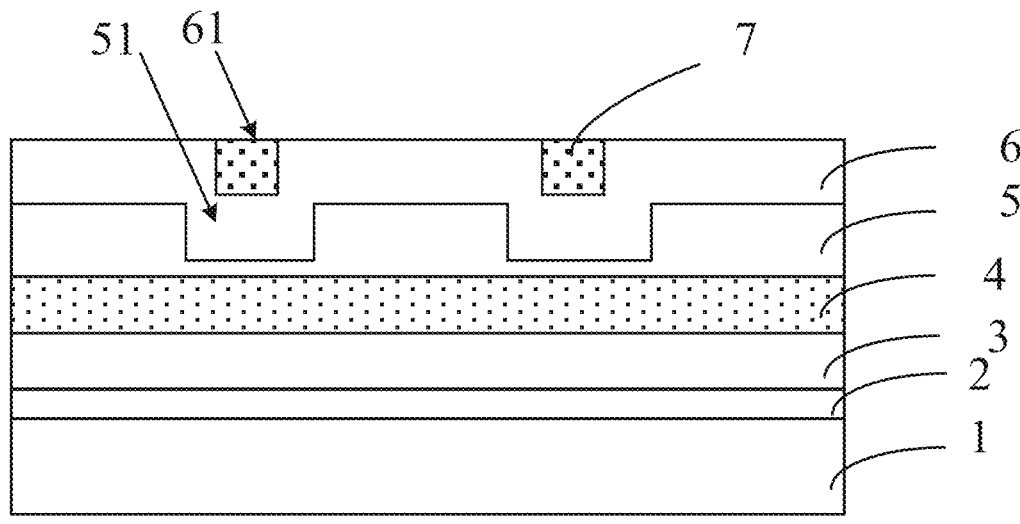
Figure 3C:
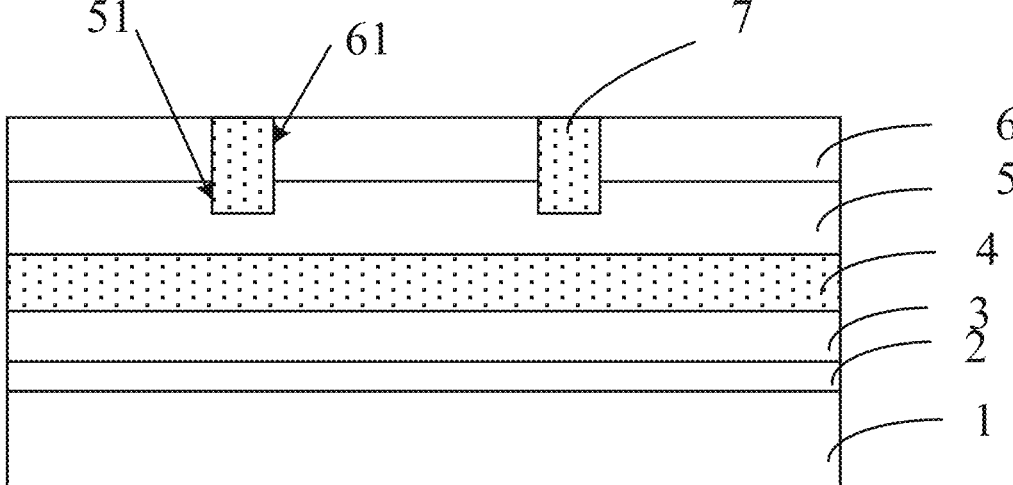

FIGS. 3A-3C are schematic views of an optical structure according to an embodiment of the present invention. Therein, FIG. 3A shows a top view schematic view according to the present invention. FIG. 3B shows a schematic cross-sectional view of the optical structure of FIG. 1 along AA' according to another embodiment.

As shown in FIGS. 3A-3C, the optical structure 300 may further include: a third isolation layer 5, which is on the second isolation layer 3 and covers a surface of the first conductive portion 4 away from the substrate layer 1, wherein the third isolation layer has a third opening 51; a fourth isolation layer 6, which is on the third isolation layer 5 and has a fourth opening 61, wherein the projection of the third opening 51 on the substrate layer 1 overlaps at least partially with the projection of the fourth opening 61; a second conductive portion 7 in the fourth isolation layer 6 and filling at least the fourth opening 61, wherein a first extension direction D1 of the first conductive portion 4 in a plane parallel to the substrate layer differs from a second extension direction D2 of the second conductive portion 7 in the plane parallel to the substrate layer, and wherein a projection of the first conductive portion on the substrate layer overlaps with a projection of the second conductive portion on the substrate layer.

As shown in FIGS. 3A-3C, the optical structure may include plural first conductive portions 4, plural first openings and plural second openings corresponding one-to-one to the plurality of first conductive portions 4, plural second conductive portions, and plural third openings and plural fourth openings corresponding one-to-one to the plural second conductive portions, wherein the plural first conductive portions are parallel to each other, and wherein the plural second conductive portions are parallel to each other.

The material of the first conductive portions and the second conductive portions may be selected from metals, for example, selected from at least one of the following: Au, Ag, Al and combinations thereof. In this way, it is possible to achieve a metal mesh with narrow line widths while solving the problem of color streaks caused by refractive index mismatch between the first and second isolation layers.

Figure 4:
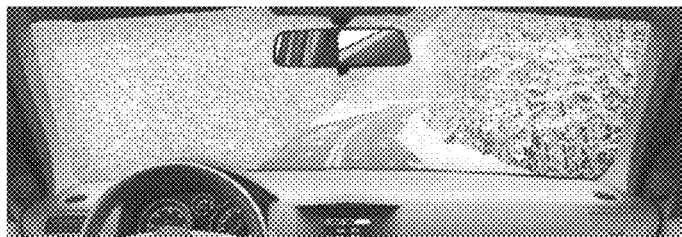
FIG. 4 shows an example of the application of an optical structure according to an embodiment of the present invention.

FIG. 4 shows an example of an optical structure application according to an embodiment of the present invention. As shown in FIG. 4, the optical structure according to an embodiment of the present invention can be used as a car film and applied to the surface of a car window glass. The right side of FIG. 4 shows the effect of using the optical structure of the present invention for window glass defogging and/or de-icing, and the left side of FIG. 4 shows the effect when no such optical structure is used or when the optical structure is turned off.

Since the conductive portion of the optical structure according to an embodiment of the present invention can achieve a narrow line width such that the human eye will not see any lines of the conductive portion (e.g., metallic lines). The overall transmittance of such a film is more than 90%, meeting the requirements of vehicle regulations. By applying electricity, the conductive portions (such as metallic lines) will generate heat due to their resistance, thus quickly eliminating ice or fog from the glass surface. Such design is very responsive and does not require additional air-conditioned hot air, making it more environmentally friendly. The film layer can be very easily integrated on rigid (e.g., glass) or flexible substrates (e.g., plastic), and can be flexibly tuned. In addition, due to the intelligent development of future cars, the number of electronic devices in the car body will increase significantly. The optical structure according to some embodiments of the present invention can realize the electromagnetic shielding function for the car window, which will enhance the anti-electromagnetic interference function of electronic components and ensure the normal and stable operation of electronic devices.

Figure 16:
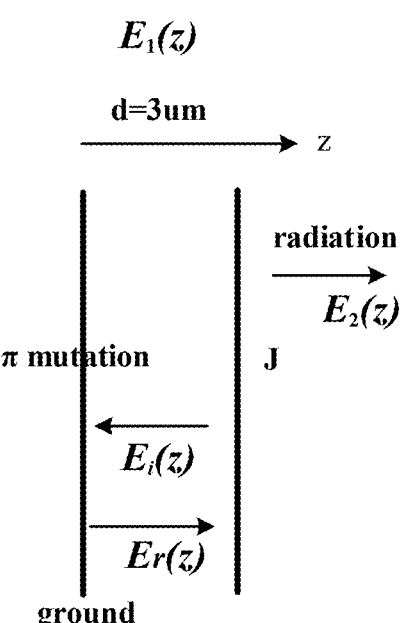
FIG. 16 is a schematic view of microwave transmission of the double-layer conductive structure of the optical structure of an embodiment of the present invention.

The microwave absorption principle of the optical structure according to some embodiments of the present invention is as follows:

FIG. 16 shows a schematic diagram of microwave transmission of the double-layer conductive structure of the optical structure of an embodiment of the present invention. For the double-layer conductive portion structure (e.g., metal mesh of metal wire) of the embodiment of the present invention, when the top and bottom are energized, the lower conductive portion (e.g., metal wire) can be used as ground and the upper conductive portion (e.g., metal wire) can be understood as a wire, thus enabling the formation of a surface current J on the surface of the conductive portion (e.g., metal), which, taking Maxwell's equations into account, can generate a magnetic field H. In addition, the two rows of conductive portions (e.g., metal wires) can form capacitance, i.e., an electric field E is also formed between the wires.

Assuming that one of the two conductive layers is the ground (Ground) and is the starting point of the z-axis, the distance of the other conductive layer is d=3 μm, the incident electric field along the Ground is Ei, the reflected electric field on the Ground is Er, the synthetic electric field between the two wires is E1, and the radiated electric field is E2, assuming a perfect absorber is formed, the radiated energy will be almost zero.

The incident electric field Ei(z) and the magnetic field Hi(z) are as follows:

$$E_i(z) = \alpha_x E_{i0} e^{-j\beta z},$$

wherein $\alpha x$ is the electric field strength coefficient, $\beta$ is the transmission coefficient, z is the transmission direction, and Ei0 is the initial electric field strength.

$$H_i(z) = a_y \frac{E_{i0}}{\eta} e^{-j\beta z},$$

wherein $\alpha y$ is the magnetic field strength coefficient, $\beta$ is the transmission coefficient, z is the transmission direction, and Hi0 is the initial magnetic field strength.

The reflected electric field Er (z) at the Ground surface, due to the 180° flip of the phase, is as follow:

$$E_r(z) = \alpha_z E_{i0} e^{j\beta z}.$$

The synthetic electric field E1(z) between the wires between the conductive portions of the double layer is as follow:

$$E_1(z) = \alpha_x (E_{r0} e^{j\beta z} + E_{i0} e^{-j\beta z}) = -\alpha_x j2E_{i0} \sin \beta z,$$

where j is an imaginary number.
Since the electric field is continuous at the upper wire position, $$E_1(d) = E_2(d).$$

Using the Poynting vector, the radiation energy radiated from the double-layer conductive structure is thus derived as follows:

$$P = \frac{1}{2} \mathrm{Re}[E_2(z) \times H_2^*(z)] = 2 \frac{E_{i0}^2}{\eta} \sin^2 \frac{2\pi}{\lambda} nd,$$

where $\eta$ is the impedance and n is the equivalent refractive index between the double conductive layers.

From the above equations, we can see that when $d \ll \lambda$, the radiation energy is almost zero, and all the electromagnetic field energy will be localized in the middle region of the two wires. For d=3 μm, the microwave region is between 300 MHz-30 GHZ, and the minimum wavelength is 10 mm, the minimum wavelength h is much larger than the distance between the wires, thus achieving the effect of perfect microwave absorption.

Figure 5:
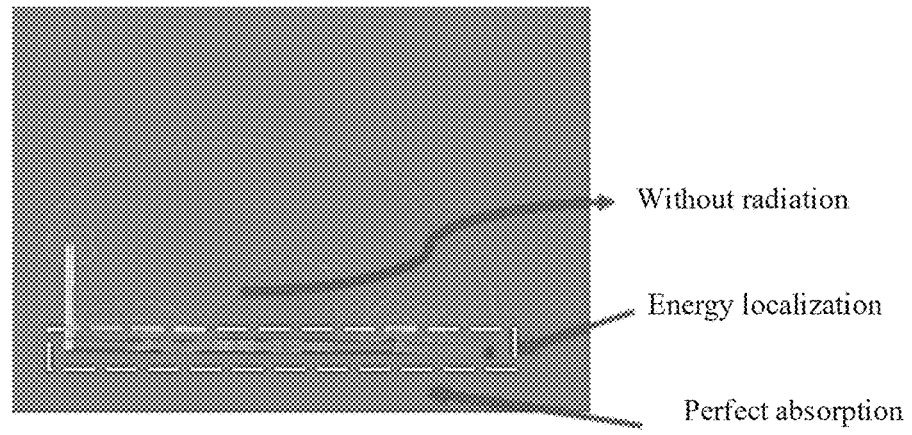
FIG. 5 shows a simulation of the electric field distribution of the double-layer conductive structure according to an embodiment of the present invention at a spacing of 10 μm.

FIG. 5 shows a simulation of the electric field distribution in the case of a spacing of 10 μm for the double-layer conductive structure according to an embodiment of the present invention. As shown in FIG. 5, it can be found that the electric field is completely localized in the middle part of the metal and the electromagnetic waves are completely absorbed.

Figure 6A:
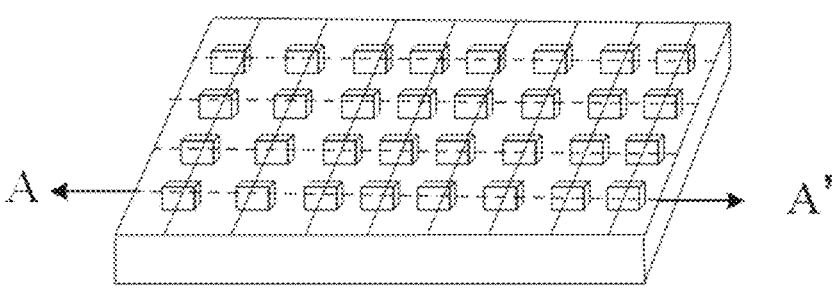
FIGS. 6A-6C are schematic views of the optical structure according to embodiments of the present invention.
Figure 6B:
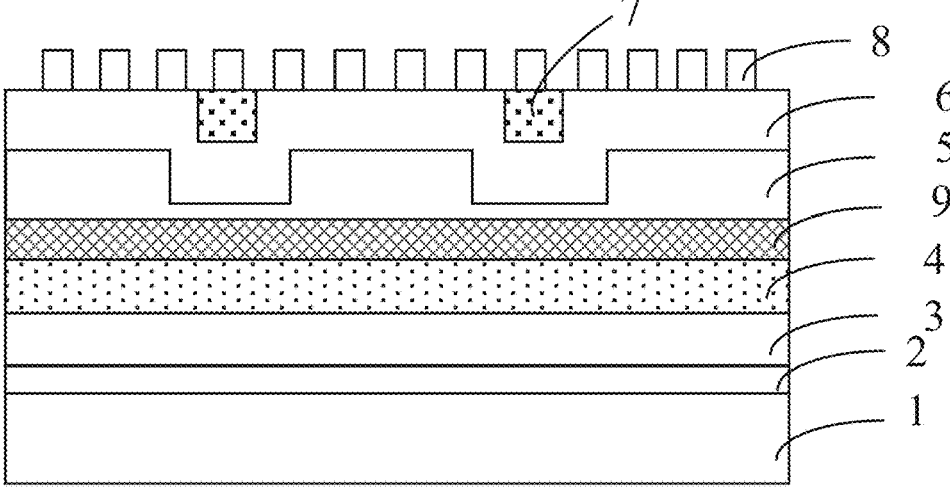
Figure 6C:
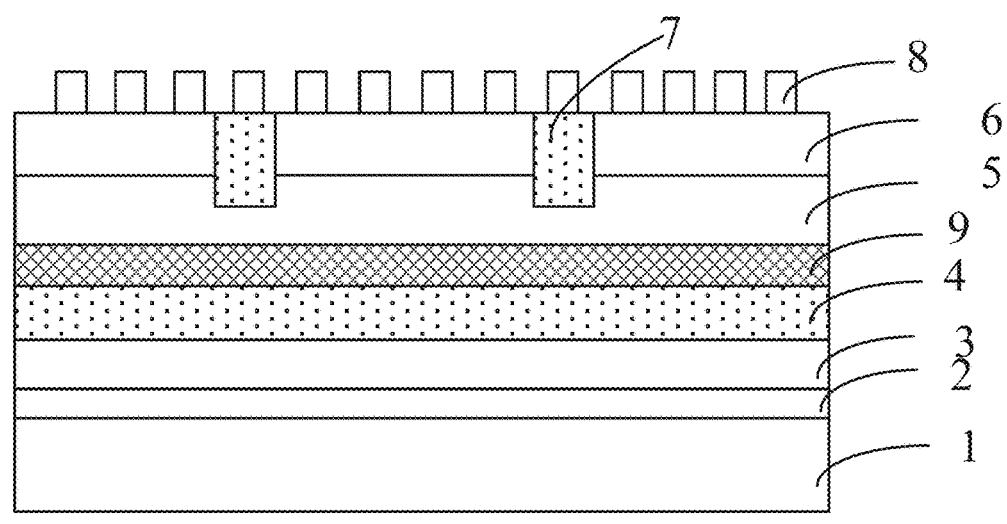

FIGS. 6A-6C are schematic views of an optical structure according to some embodiments of the present invention. In particular. FIG. 6A shows a top view schematic view of the optical structure according to an embodiment of the present invention. FIGS. 6B and 6C are schematic views of cross section views along line AA' of the optical structure according to other embodiments.

As shown in FIGS. 6A-6C, the optical structure according to some embodiments of the present invention may also include: nanometallic particles 8 on a side of the second conductive portion 7 away from the substrate layer 1, and a dielectric elastomer 9 between the first conductive portion 4 and the second conductive portion 7. By varying the thickness of the dielectric elastomer through applying a voltage, it is possible to change the wavelength absorbed by the nanoparticles, thereby achieving color modulation of the optical structure.

Dielectric elastomers may include at least one of: polyacrylate and silicone rubbers. The nanometallic particles may include silver nanoparticles. The substrate layer may include a flexible substrate layer, for example, may be a COP layer. The first conductive portion and the second conductive portion may be at least one of: Cu. Au. Al. and mixtures thereof. At least one of the first conductive portion and the second conductive portion may also be provided to include a transparent conductive oxide, according to needs. For example, the second conductive portion can be arranged to include ITO.

Figure 7:
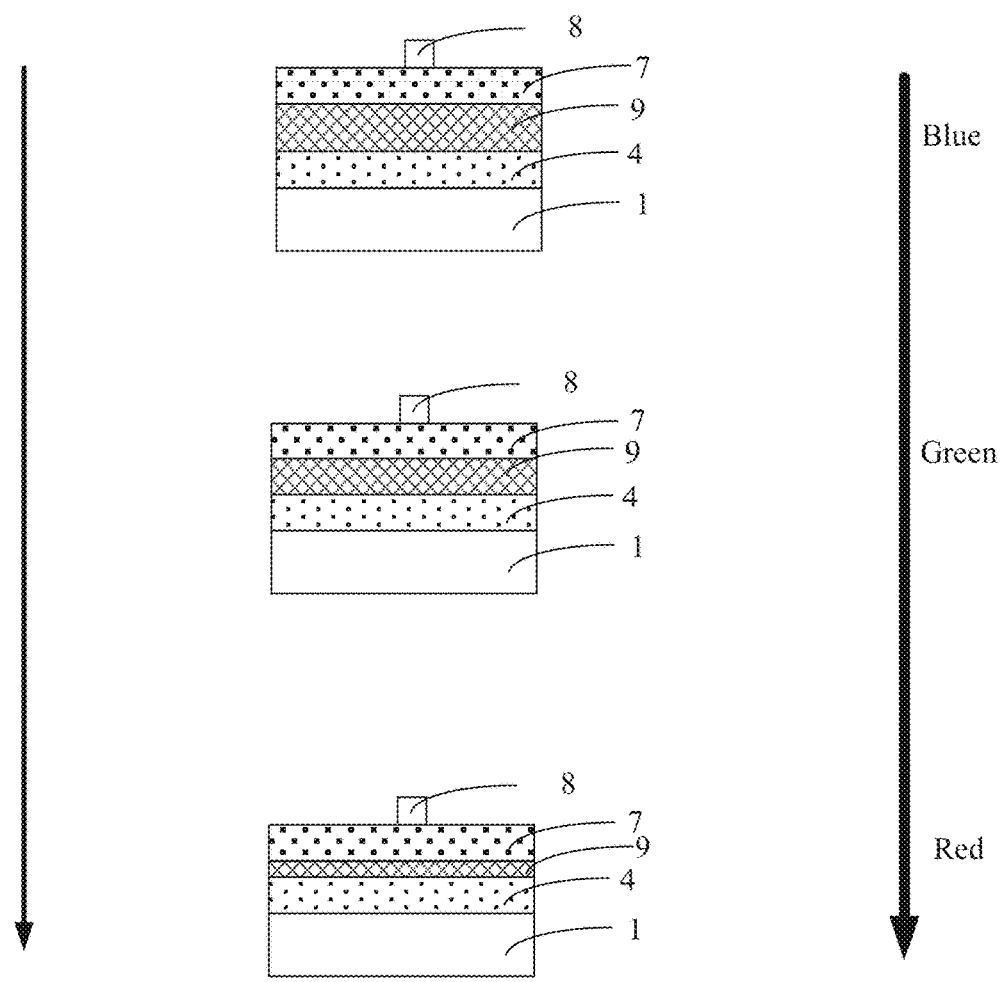
FIG. 7 shows a schematic view of the variation of light absorbed by an optical structure as the voltage varies.

FIG. 7 shows a schematic view of the change in the light absorbed by the optical structure as the voltage changes. As shown in FIG. 7, as the voltage becomes larger, the thickness of the dielectric elastomer becomes smaller and the light absorbed by the optical structure gradually changes from blue light to green light then to red light.

This can be combined with the circuit design to dynamically apply different voltages to different locations to change the thickness of the dielectric elastomer and thus absorb light with different wavelengths. Plural pixel cells can be defined by inputting a high voltage level to one of the first conductive section and the second conductive section and a low level to the other of the first conductive section and the second conductive section. Four pixel cells can be set as one pixel to better achieve color display control.

FIG. 8 shows a top view schematic view of an optical structure according to an embodiment of the present invention. As shown in FIG. 8, the substrate layer 1 has a first side S1 and a second side S2 adjacent to the first side S1. The first side S1 extends in a direction different from both the first extension direction of the first conductive portion 4 and the second extension direction of the second conductive portion 7, and the second side S2 extends in a direction different from both the first extension direction of the first conductive portion 4 and the second extension direction of the second conductive portion 7. Such a setting can solve the problem of moiré, thereby enhancing the display effect. In some embodiments, the first extension direction of the first conductive portion can be set to be 45° or 66° from the extension direction of the first side to solve the problem of moiré.

FIG. 9 shows a simulation diagram of the optical characteristics of the optical structure according to an embodiment of the present invention. As shown in FIG. 9, when a voltage is applied to the first conductive portion and the second conductive portion, the structure formed by a single nanoparticle and the substrate has perfect absorption characteristics. The electric field distribution is shown on the right, and the energy is completely localized in the dielectric layer between the nanoparticle and the substrate. The pixel electrodes are completely meshed in order to ensure the transparency of the display and the better contact between the metal nanoparticles and the electrical elastomer. In FIG. 9, the reflectance trend is calculated based on the height and width of the metal nanoparticles (50-80 nm for the height and 45-65 nm for the width of the square particles), with $R=1-T-A$ (where R is the reflection coefficient. T is the transmission coefficient, and A is the absorption coefficient). Due to the strong reflective properties of the metal substrate (the metal substrate on the glass can be Ag. Al. or Au) and the non-transmissive property, the absorption spectrum can be obtained indirectly by the variation of the reflectance. As can be seen from the reflection effect graph, the absorption effect can reach 100%. The trend of the reflectance for different incident angles is shown in FIG. 9. For the incidence angle from 0)° (vertical incidence) to ±60° tilt angle, the absorbance remains basically constant and is always close to perfect absorption, and such design perfectly matches the design of the high efficiency thermo-optical spectrometer. By calculating the change trend graph of spacing and reflectivity between different nanoparticles and substrate, it can be found that the influence of spacing on absorption wavelength shows a linear change trend, and a continuous tuning change of wavelength range from 400 nm-650 nm can be achieved between 4 nm-20 nm. By designing the electro elastomer through applying electricity to the top and bottom of the electro elastomer, the compression of the electro elastomer is achieved, i.e., the thickness is changed. The change in thickness can be tuned to absorb different wavelengths and thus achieve different color displays.

FIG. 10 shows a schematic flow chart of a method for manufacturing an optical structure according to an embodiment of the present invention. As shown in FIG. 10, the method for fabricating an optical structure according to an embodiment of the present invention may include:

S1. Forming a first isolation layer on a substrate layer, wherein the first isolation layer has a first opening on a side away from the substrate layer;

S3. Forming a second isolation layer on the first isolation layer, wherein the second isolation layer has a second opening on a side away from the substrate layer, wherein a projection of the first opening on the substrate layer overlaps at least partially with a projection of the second opening on the substrate layer, and wherein a ratio of the refractive index of the first isolation layer to the refractive index of the second isolation layer is in a range of 0.95 to 1.05;

S5. Forming, in the second isolation layer, a first conductive layer filling the second opening.

In some embodiments, the ratio of the refractive index of the first isolation layer to the refractive index of the second isolation layer may be 1.

FIGS. 11A-11L show a schematic flow chart of a method for manufacturing an optical structure according to an embodiment of the present invention. As shown in FIGS. 11A-11L, a method for manufacturing an optical structure according to an embodiment of the present invention may include:

S11. Forming a first isolation material layer 2' on a substrate layer 1 as shown in FIG. 11A. The substrate layer may be a flexible substrate (e.g., including COP), or may be a rigid substrate (e.g., including glass). The first isolation material layer can be formed by coating (e.g., by slit coating) an organic adhesive material (e.g., SOC). Optionally, the viscosity of the organic adhesive material is set to 10 cps or less. For the case where the first isolation material includes SOC, baking and UV exposure can be used to cure the organic film layer SOC in order to ensure its uniformity.

S13. As shown in FIG. 11B, a second isolation material layer 3' is formed on the first isolation material layer 2'. For example, an inorganic layer (e.g., SiON) can be deposited (e.g., by TFT-CVD) on the first isolation material layer 2' to form a second isolation material layer 3' to serve as a hard mask in a subsequent process.

Figure 11D:
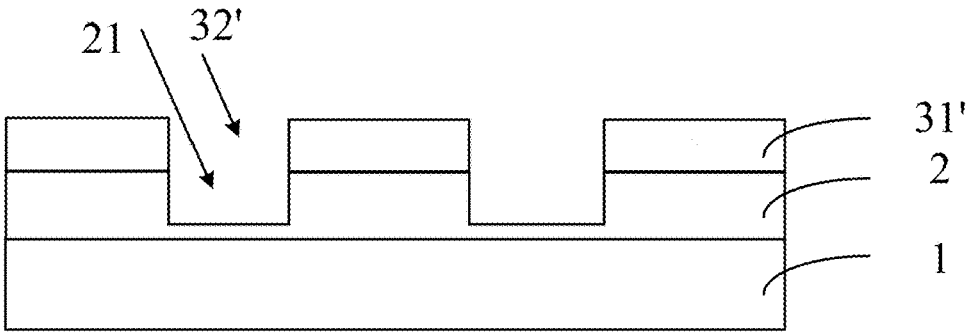

S15. As shown in FIG. 11D, patterning the first isolation material layer 2' and the second isolation material layer 3' (e.g., in one patterning process) to form a first isolation layer 2 with a first opening 21 and an etched second isolation material layer 3', wherein the etched second isolation material layer has a retained first sub-part and 31' a first hollowed-out part 32'. The projection of this first hollow portion 32' on the substrate layer overlaps with the projection of the first opening 21 on the substrate layer. Specifically, as shown in FIG. 11C, the photoresist 10 can be coated (e.g., spin-coated) on the second isolation material layer 3', followed by exposure and development, then followed by etching (e.g., dry etching) of the first isolation material layer 2' and the second isolation material layer 3', later followed by stripping (e.g., by a RIE strip process) the photoresist.

It should be noted that in FIG. 11D, taking the first opening of the first isolation layer 2 not arriving at the substrate layer as an example, the first opening of the first isolation layer 2 can be set to arrive at the substrate layer, according to needs. In the example where the first opening of the first isolation layer does not arrive at the substrate layer, such arrangement could protect the substrate layer from damage of the subsequent etching process.

Figure 11E:
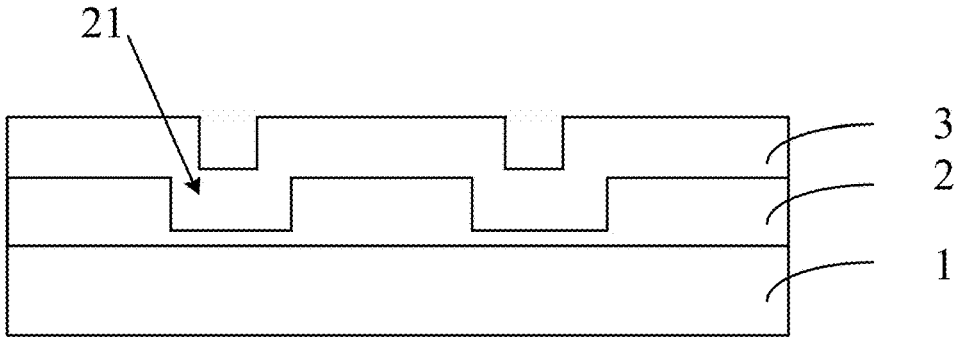

S17. As shown in FIG. 11E, a second isolation material is grown at least in the first opening to form the second isolation layer 3. According to needs, a second isolation material may also be grown in the first hollowed-out part. Epitaxial growth (e.g., TFE-CVD) can be used to grow the second isolation material. This enables steep and straight grooves to be achieved at a lower cost. Due to the different rates of normal deposition and tangential deposition, the width of the second opening of the second isolation layer can be ensured to be less than 1.5 μm by carefully calculating the deposition thickness of an epitaxial layer, thus achieving a narrow line width to ensure an overall transmittance of 90% or more. Moreover, since the refractive indices of the first and second isolation layers are set to match, it is possible to achieve no dispersion.

Figure 11F:
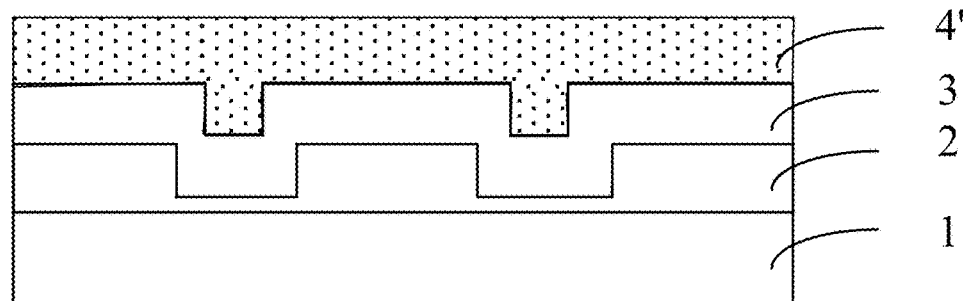
Figure 11G:
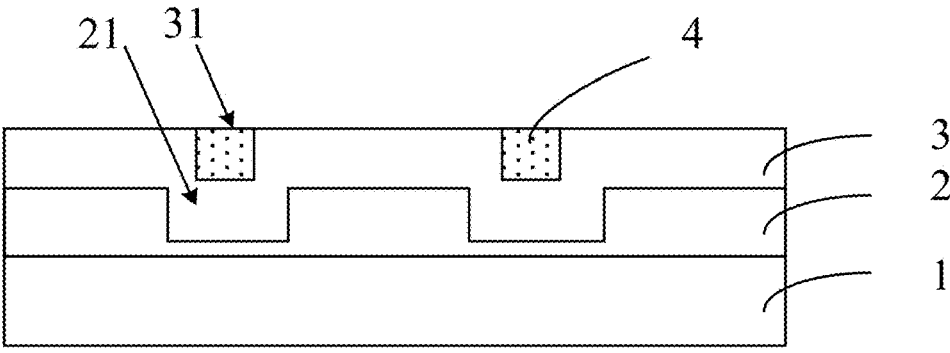

S19. Forming a first conductive portion 4' in the second opening. Specifically, a first conductive material layer can be provided on the second isolation layer 3 as shown in FIGS. 11F-11G. For example, a metallic material can be sputtered on the second isolation layer. Then the first conductive portion in the second opening is formed by wet etching. By the method of an embodiment of the present invention, it is possible to set the width of the first conductive portion in a direction parallel to the substrate layer to within 1.5 microns, thereby enabling a narrow line width and achieving a transparent visual effect to the human eye.

S21. Forming a third isolation layer on the second isolation layer, wherein the third isolation layer covers a surface of the first conductive portion away from the substrate layer and has a third opening, and wherein the projection of the third opening on the substrate layer overlaps at least partially with the projection of the fourth opening on the substrate layer; forming a fourth isolation layer on the third isolation layer, the fourth isolation layer has a fourth opening; forming, in the fourth isolation layer, a second conductive portion which is in the fourth isolation layer and which fills at least the fourth opening, wherein the first extension direction of the first conductive portion in a plane parallel to the substrate layer differs from the second extension direction of the second conductive portion in the plane parallel to the substrate layer, and wherein the projection of the first conductive portion on the substrate layer overlaps with the projection of the second conductive portion on the substrate layer.

Figure 11H:
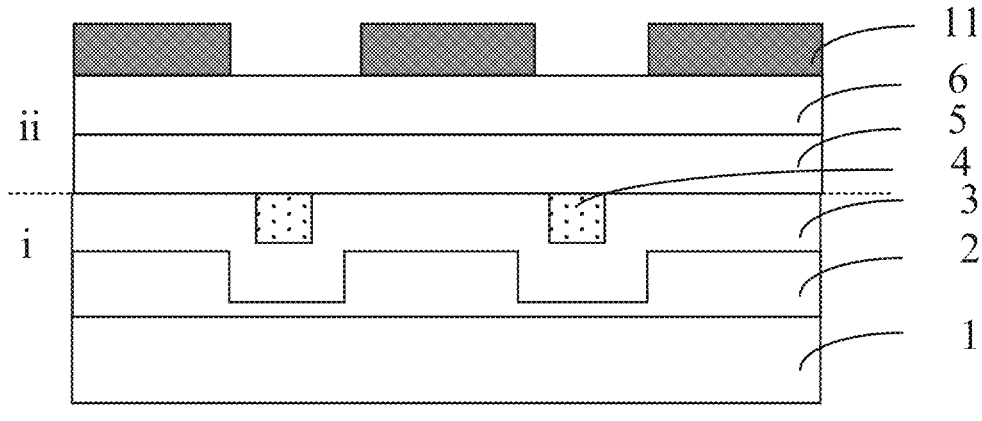

Specifically, similar to the fabrication of the first isolation layer, the second isolation layer and the first conductive portion, the third isolation layer, the fourth isolation layer and the second conductive portion can be formed as shown in FIGS. 11H-11L as follows:

As shown in FIG. 11H, forming a third isolation material layer 5 on the second isolation material layer 3, and forming a fourth isolation material layer 6 on the third isolation material layer 5. The processes for forming the third isolation material layer and the fourth isolation material layer can be referred to the processes for forming the first isolation material layer and the second isolation material layer described previously, respectively, and will not be described herein in detail. The fourth isolation material layer 6 is further coated with photoresist 11, and then is exposed and developed.

Figure 11I:
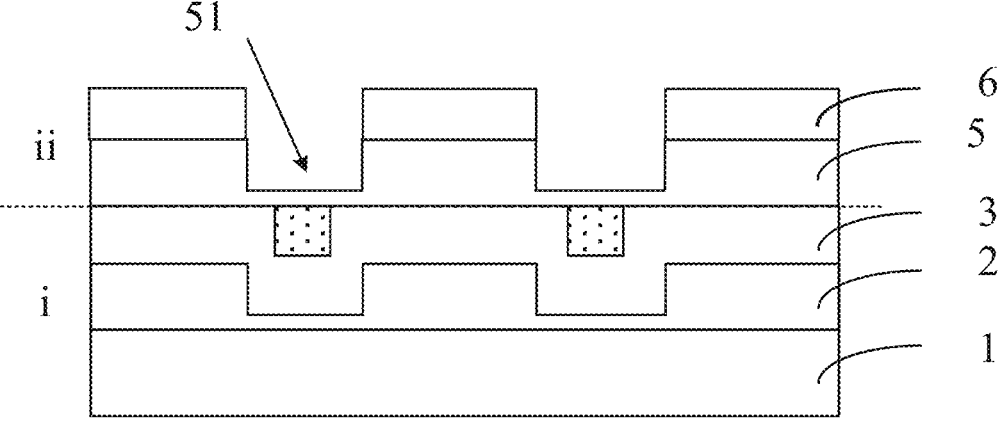

As shown in FIG. 11I, etching (e.g., dry etching) a third isolation material layer 5' and a fourth isolation material layer 6' to form a third isolation layer 5 having a third opening 51 and an etched fourth isolation material layer 6', wherein the etched fourth isolation material layer has a retained first sub-part 61' and a first hollowed-out part 62', the projection of this first hollowed-out part 62' on the substrate layer overlaps with the projection of the third opening 51 on the substrate layer. The photoresist is then stripped (e.g., by a RIE strip process). It should be noted that here, in order to show the processing of line widths of the upper and lower narrow conductive portions (e.g., metal) as simultaneously as possible, the cross-sectional view modifies the upper and lower conductive layers originally perpendicular to each other to be shown parallel (in other words, regions i and ii correspond to different cross-sections), which differs from the real structure cross-section.

It should be noted that in FIG. 11I, the depth of the third opening of the third isolation layer is less than the thickness of the third isolation layer as an example, or the third opening of the third isolation layer can be equal to the thickness of the third isolation layer according to the example. In the example where the third opening of the third isolation layer is smaller than the third isolation layer, this protects the layer below it from to the etching process.

Figure 11J:
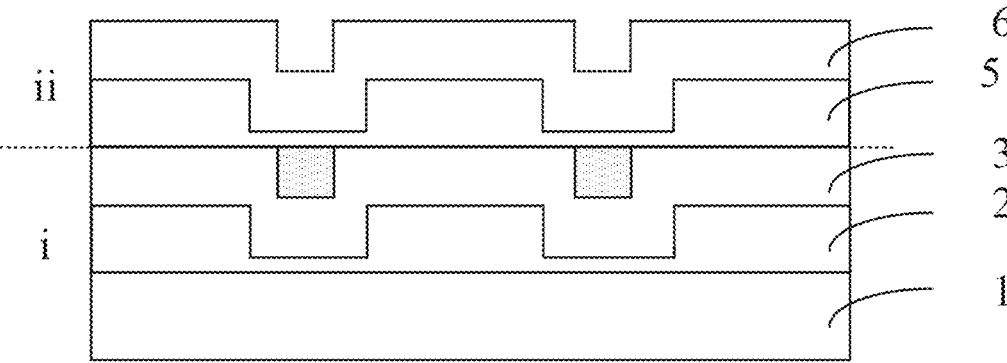

As shown in FIG. 11J, at least the third isolation material is grown in the third opening to form the fourth isolation layer 3. According to needs, the fourth isolation material may also be grown in the third hollowed-out part. Epitaxial growth (e.g., TFE-CVD) can be used to grow the fourth isolation material. This enables steep and straight grooves to be achieved at a lower cost. Due to the different rates of normal and tangential deposition thicknesses, the width of the fourth opening of the fourth isolation layer can be ensured to be less than 1.5 μm by carefully calculating the deposition thickness of the epitaxial layer, thus achieving a narrow line width to ensure an overall transmittance of 90% or more. Moreover, since the refractive indices of the third and fourth isolation layers are set to match, it is also possible to achieve no dispersion.

Figure 11K:
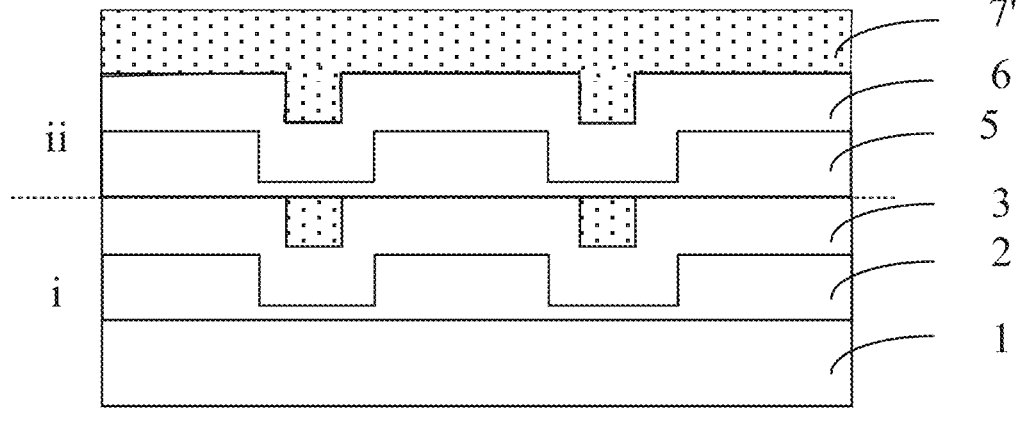
Figure 11L:
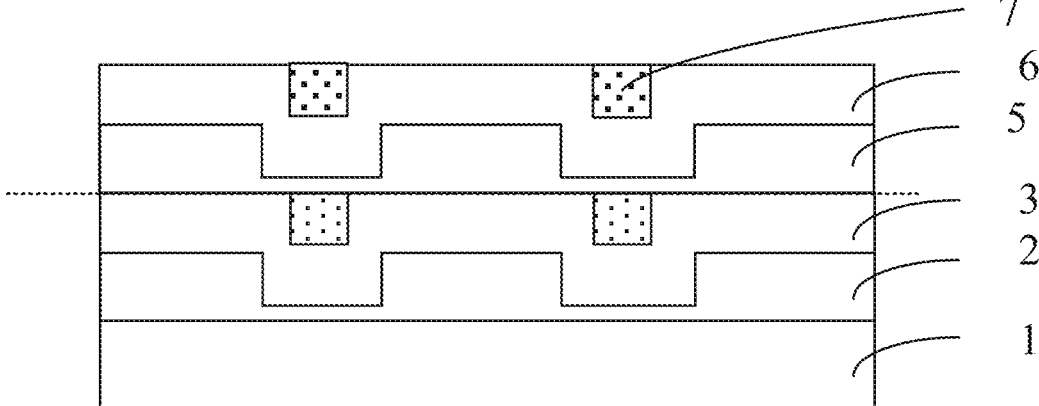

The method according to an embodiment of the present invention further includes forming a second conductive portion in the fourth opening. Specifically, a second conductive material layer 7' can be provided on the second isolation layer 3 as shown in FIGS. 11K-11L. For example, a metallic material can be sputtered on the fourth isolation layer. Then the second conductive portion is formed in the fourth opening by wet etching. By the method of an embodiment of the present invention, it is possible to set the width of the second conductive portion parallel to the substrate layer to within 1.5 microns, thereby enabling a narrow line width and achieving a transparent visual effect to the human eye.

Figure 12:
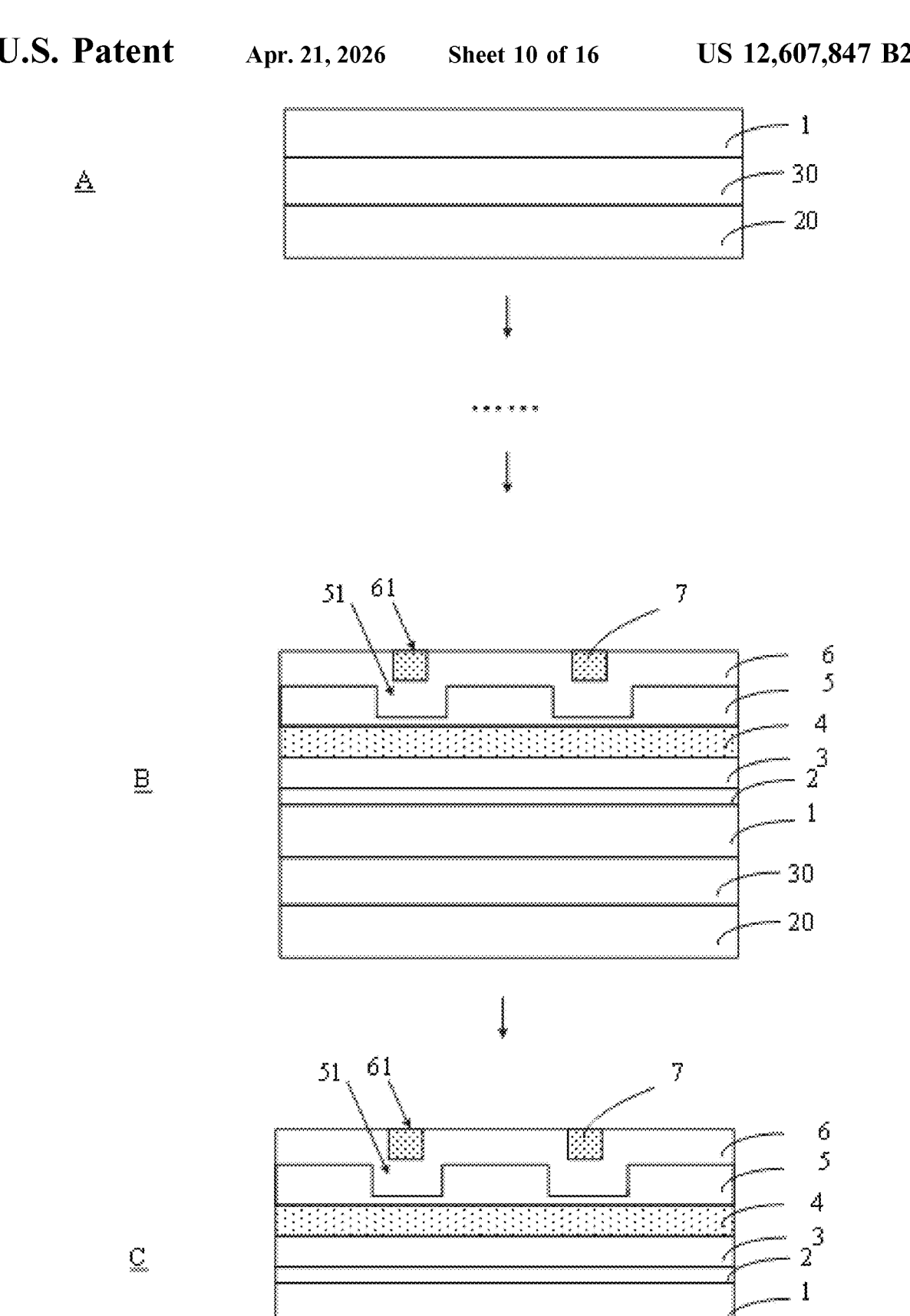
FIG. 12 shows a schematic view of a method for manufacturing an optical structure according to an embodiment of the present invention.

FIG. 12 shows a schematic view of a method for manufacturing an optical structure according to an embodiment of the present invention. As shown in (A) of FIG. 12, before proceeding to the step shown in FIG. 11A, the method can also provide a substrate 20 (such as glass), arrange the substrate layer 1 on the substrate 20 by OCA 30, and then proceed to the step shown in FIG. 11 to obtain the structure shown in FIG. 12 (B). Then Delamin is used to separate the OCA and substrate from the structure thereon.

Figure 13A:
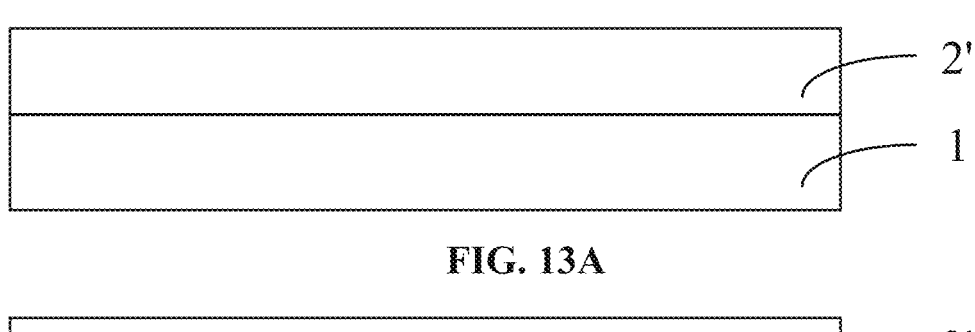
FIGS. 13A-13J are schematic views of a method for manufacturing an optical structure according to an embodiment of the present invention.

FIGS. 13A-13J are schematic views of a method for fabricating an optical structure according to an embodiment of the present invention. As shown in FIGS. 13A-13J, a method for fabricating an optical structure according to an embodiment of the present invention may include:

As shown in FIG. 13A, forming a first isolation material layer 2' on the substrate layer 1. The substrate layer may be a flexible substrate (e.g., including COP), or may be a rigid substrate (e.g., including glass). The first isolation material layer can be formed by slit coating an organic adhesive (e.g., SOC). Optionally, the viscosity of the organic adhesive material is 10 cps or less. For the case where the first isolation material includes SOC, baking and UV exposure can be used to cure the organic film layer SOC in order to ensure its uniformity.

Figure 13B:
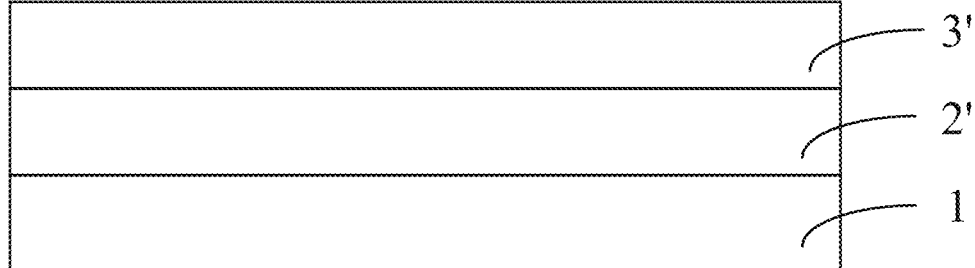

As shown in FIG. 13B, a second isolation material layer 3' is formed on the first isolation material layer 2'. For example, an inorganic layer (e.g., SiON) can be deposited (e.g., by TFT-CVD) on the first isolation material layer 2' to form a second isolation material layer 3' to serve as a hard mask in a subsequent process.

Figure 13C:
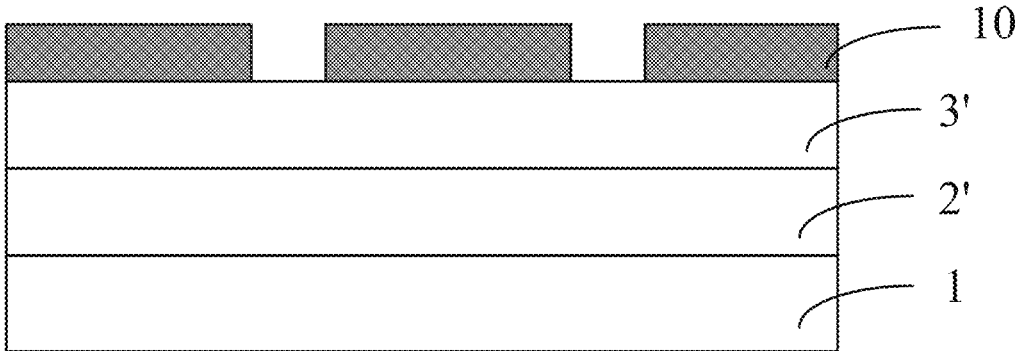
Figure 13D:
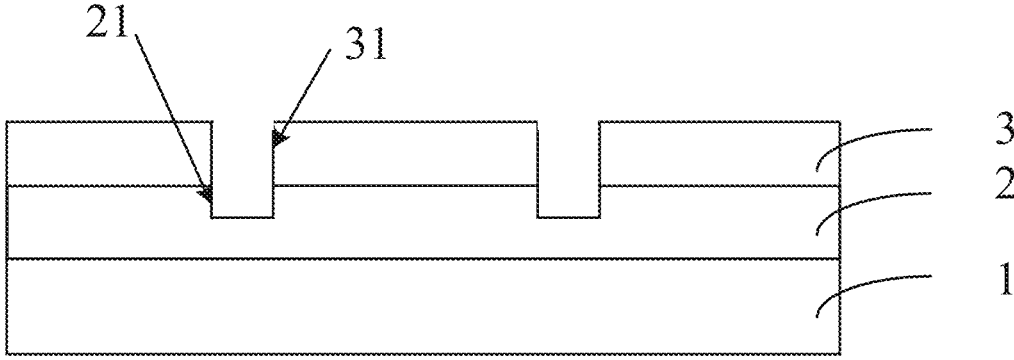

As shown in FIGS. 13C-13D, a photoresist 10 can be coated (e.g., spin-coated) on the second isolation material layer 3', followed by exposure and development using a high-precision exposure machine, later followed by etching (e.g., dry etching) of the first isolation material layer 2' and the second isolation material layer 3', and then (e.g., by ICP strip process) to strip the photoresist. This can save one step of TFE-CVD and achieve process simplification.

It should be noted that, in FIG. 13D, the depth of the first opening of the first isolation layer 2 being less than the thickness of the first isolation layer as is exemplary, alternatively, according to needs, the depth of the first opening of the first isolation layer 2 can be equal to the thickness of the first isolation layer. In the example where the first opening of the first isolation layer does not arrive at the substrate layer, this protects the substrate layer from damage of the subsequent etching process.

Figure 13E:
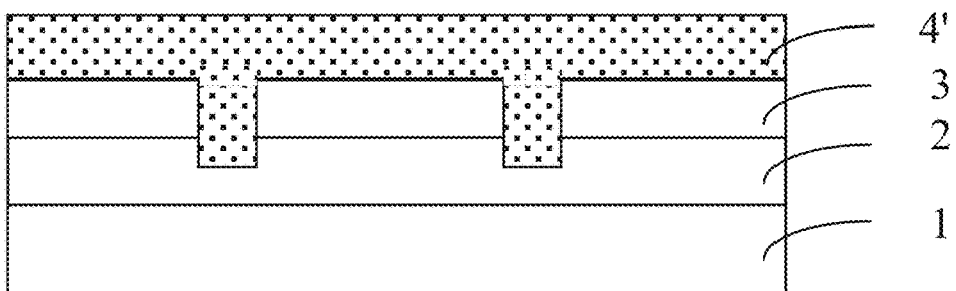

As shown in FIG. 13E, a first conductive material layer 4' is provided on the second isolation layer 3. For example, a metallic material can be sputtered on the second isolation layer.

Figure 13F:
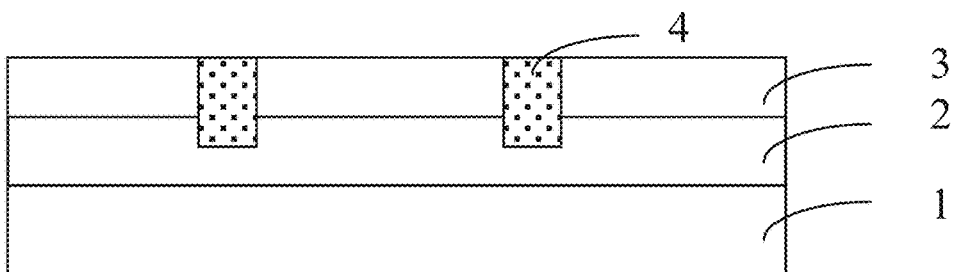

As shown in FIG. 13F, the first conductive portion in the second opening can be formed, for example, by wet etching. By the method of an embodiment of the present invention, the width of the first conductive portion on the substrate layer parallel to the substrate layer can be within 1.5 microns, thereby enabling a narrow line width and achieving a transparent visual effect to the human eye.

Figure 13G:
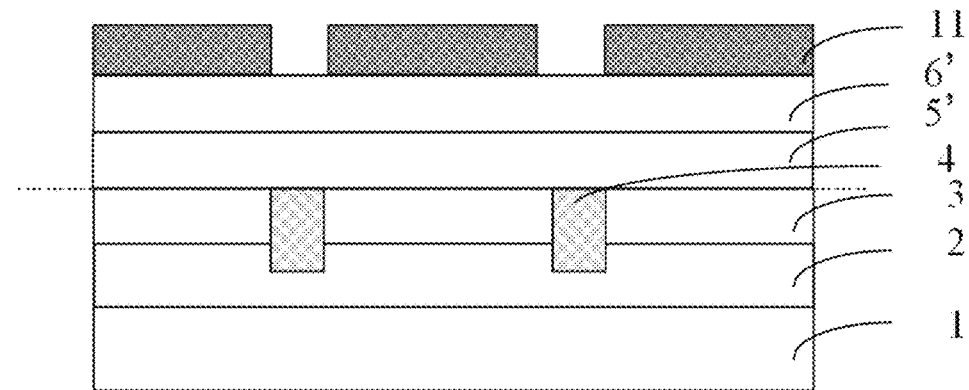
Figure 13H:
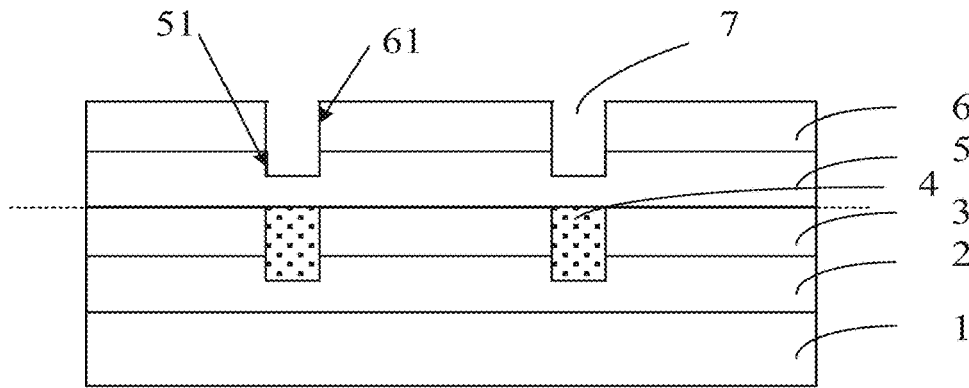

Similar to the fabrication of the first isolation layer, the second isolation layer and the first conductive portion, the third isolation layer, the fourth isolation layer and the second conductive portion can be formed by the following methods:

As shown in FIGS. 13G-13H, a third isolation material layer 5' is formed on the second isolation material layer 3, and a fourth isolation material layer 6' is formed on the third isolation material layer 5', and the processes for forming the third isolation material layer and the fourth isolation material layer can be respectively referred to formation processes of the first isolation material layer and the second isolation material layer, respectively, as previously described, and will not be described herein. A photoresist 11 can be coated (e.g., spin-coated) on the fourth isolation material layer 6', then exposed and developed using a high-precision exposure machine, and then the third isolation material layer 5' and the fourth isolation material layer 6' is etched (e.g., dry etched) to form the third isolation layer 5 and the fourth isolation layer 6, and then the photoresist is peeled off (e.g., by ICP strip process). This can save one step of TFE-CVD and achieve process simplification.

In FIG. 13H, the depth of the third opening of the third isolation layer being less than the thickness of the third isolation layer is exemplary, alternatively, according to needs, the depth of the third opening of the third isolation layer could be equal to the thickness of the third isolation layer. In the example where the depth of the third opening of the third isolation layer is smaller than the thickness of the third isolation layer, this protects the layer below it from to the etching process.

Figure 13I:
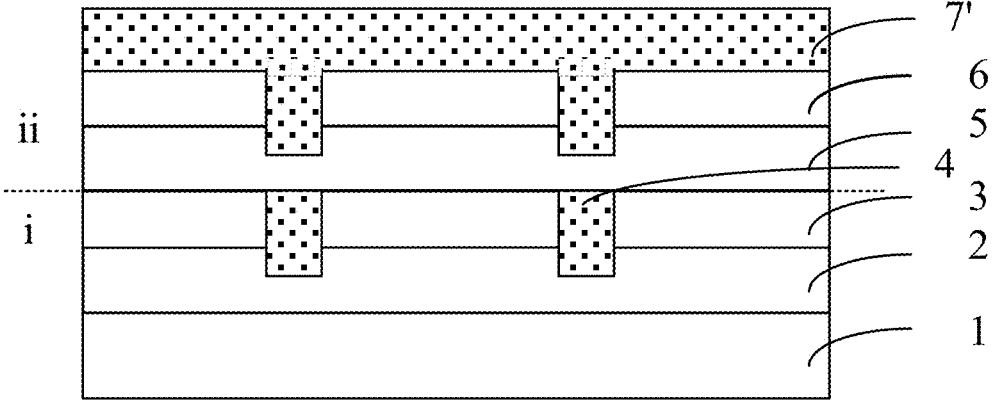

As shown in FIG. 13I, a second conductive material layer 7' is provided on the fourth isolation layer 6. For example, a metallic material can be sputtered on the fourth isolation layer.

Figure 13J:
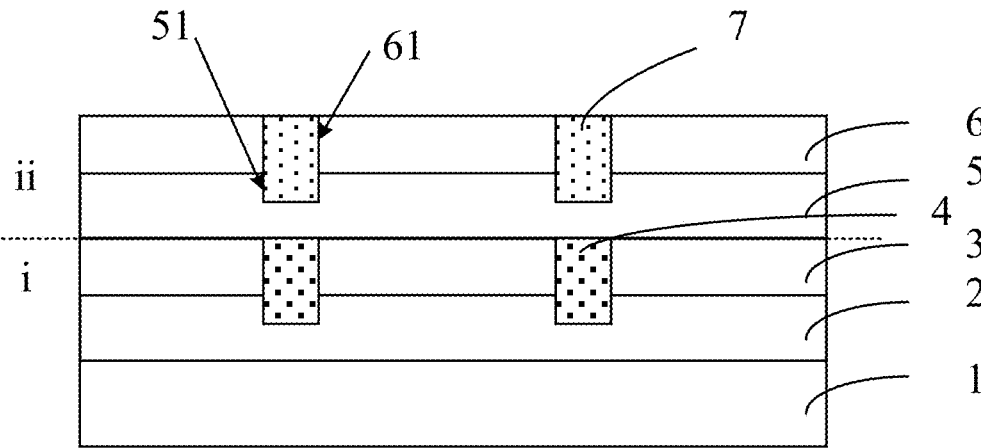

As shown in FIG. 13J, the first conductive portion in the fourth opening can be formed, for example, by wet etching. By the method of an embodiment of the present invention, the width of the first conductive portion on the substrate layer parallel to the substrate layer can be within 1.5 microns, thereby enabling a narrow line width and achieving a transparent visual effect to the human eye.

Figure 14:
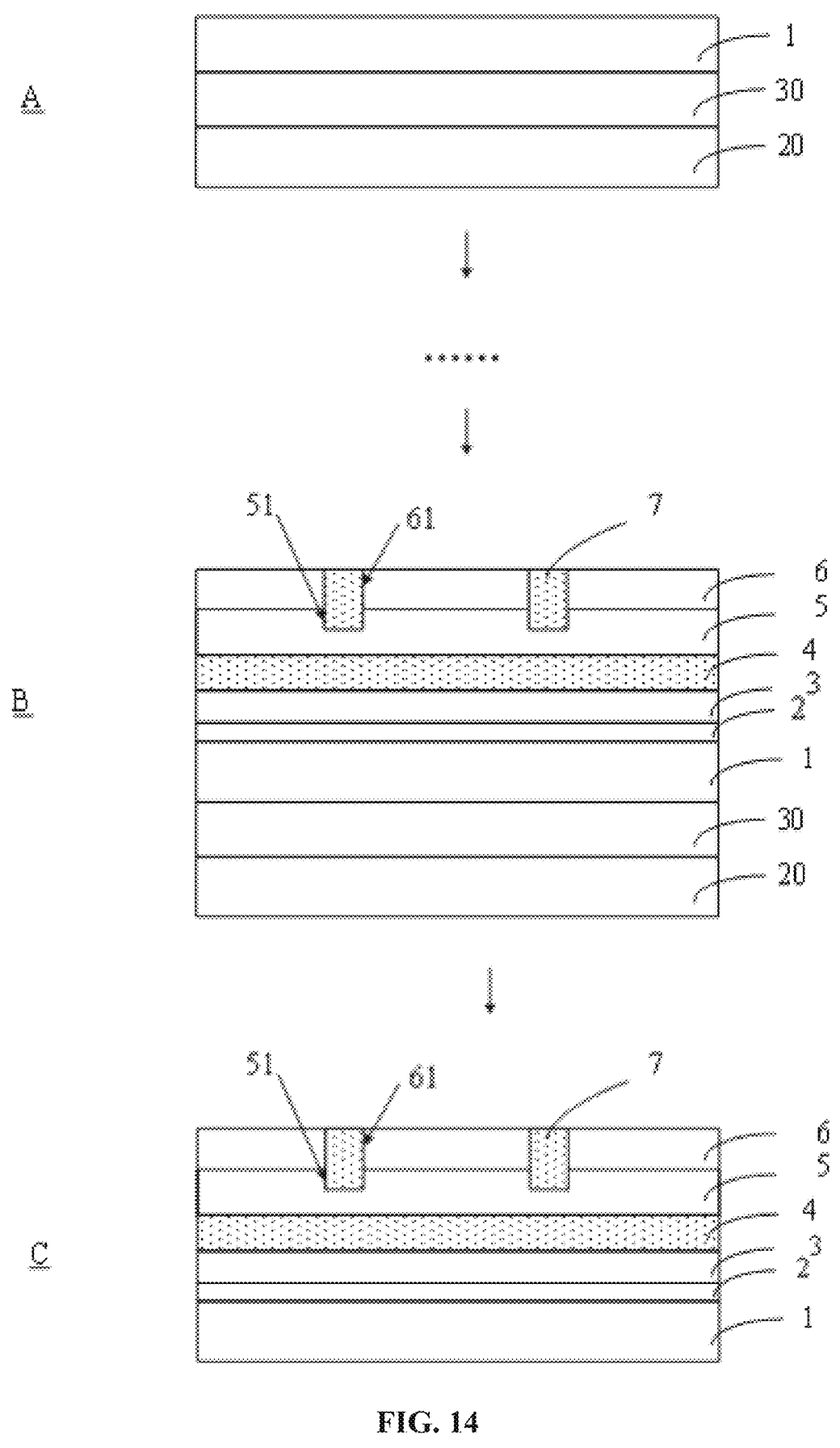

FIG. 14 shows a schematic view of a method for manufacturing an optical structure according to an embodiment of the present invention. As shown in (A) of FIG. 14, before proceeding to the step shown in FIG. 13A, the method may also provide a substrate 20 (such as glass), arrange the substrate layer 1 on the substrate 20 by OCA 30, and then proceed to the step shown in FIG. 11 to obtain the structure shown in FIG. 14 (B). Then using Delamin for separating the OCA and the substrate from the structure thereon.

Figure 15:
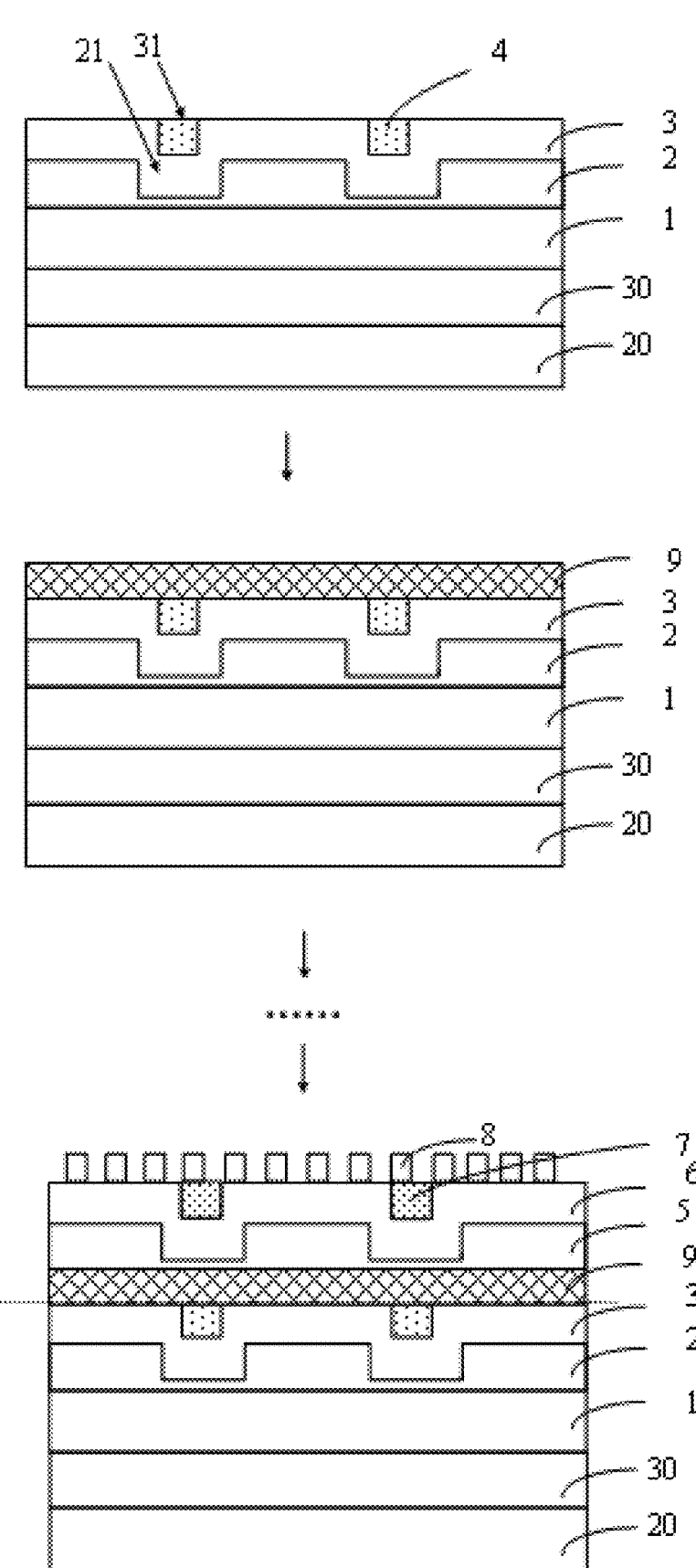
FIG. 15 shows a schematic view of a method for manufacturing an optical structure according to an embodiment of the present invention.

FIG. 15 shows a schematic view of a method for manufacturing an optical structure according to an embodiment of the present invention. As shown in FIG. 15, the method for fabricating an optical structure according to an embodiment of the present invention may further include: after forming a first conductive portion (see, for example, FIGS. 11A-11G or FIGS. 13A-13F), forming a dielectric elastomer 9 on the first conductive portion. The dielectric elastomer may be formed using a nano self-assembly process. After forming the second conductive portion, nanometallic particles 8 are formed on the second conductive portion and the fourth isolation layer. Liquid containing nanoparticles may be diluted, applied dropwise to the surfaces of the second conductive portion and the fourth isolation layer, and then dried in an N2 ambient environment to form the nanometallic particles. The substrate 10 and OCA 30 can then be peeled off to form the optical structure.

The specific embodiments have been described, and are not intended to limit the scope of the disclosure. In fact, the novel embodiments described herein can be implemented in a variety of other forms. In addition, various omissions, substitutions, and changes in the form of the embodiments described herein may be made without departing from the spirit of the disclosure. The following claims and their equivalents are intended to cover such forms or modifications that fall within the scope and spirit of the disclosure.

What is claimed is:

1. An optical structure, comprising:
   a substrate layer;
   a first isolation layer on the substrate layer and having a first opening on a side away from the substrate layer;
   a second isolation layer on the first isolation layer and having a second opening on a side away from the substrate layer, wherein a projection of the first opening on the substrate layer overlaps at least partially with a projection of the second opening on the substrate layer, and wherein a ratio of a refractive index of the first isolation layer to a refractive index of the second isolation layer is in a range of 0.95 and 1.05;

a first conductive portion in the second isolation layer and filling at least the second opening;

a third isolation layer on the second isolation layer and covers a surface of the first conductive portion away from the substrate layer, wherein the third isolation layer has a third opening;

a fourth isolation layer on the third isolation layer and having a fourth opening, wherein a projection of the third opening on the substrate layer overlaps at least partially with a projection of the fourth opening on the substrate layer; and a second conductive portion in the fourth isolation layer and filling at least the fourth opening, wherein a first extension direction of the first conductive portion in a plane parallel to the substrate layer differs from a second extension direction of the second conductive portion in the plane parallel to the substrate layer, and wherein a projection of the first conductive portion on the substrate layer overlaps with a projection of the second conductive portion on the substrate layer.

2. The optical structure according to claim 1, wherein the ratio of the refractive index of the first isolation layer to the refractive index of the second isolation layer is 1.

3. The optical structure according to claim 1, wherein the second isolation layer extends into the first opening of the first isolation layer and covers a surface portion of the first isolation layer exposed by the first opening, and wherein a projection of the second opening on the substrate layer is within a projection of the first opening on the substrate layer.

4. The optical structure according to claim 1, wherein the second opening arrives at the first opening, wherein the projection of the second opening on the substrate layer overlaps with the projection of the first opening on the substrate layer, and wherein the first conductive portion further fills the first opening.

5. The optical structure according to claim 1, wherein the optical structure comprises plural first conductive portions;

plural first openings and plural second openings corresponding one-to-one to the plural first conductive portions;

plural second conductive portions; and plural third openings and plural fourth openings corresponding one-to-one to the plural second conductive portions, wherein the plural first conductive portions are parallel to each other, and wherein the plural second conductive portions are parallel to each other.

6. The optical structure according to claim 1, further comprising:

nanometallic particles on a side of the second conductive portion away from the substrate layer; and a dielectric elastomer between the first conductive portion and the second conductive portion.

7. The optical structure according to claim 6, wherein the substrate layer has a first side and a second side adjacent to the first side, wherein an extension direction of the first side is different from both the first extension direction and the second extension direction, and wherein an extension direction of the second side is different from both the first extension direction and the second extension direction.

8. The optical structure according to claim 6, wherein the dielectric elastomer comprises at least one of: polyacrylate and silicone rubber;

the nanometallic particles comprises silver nanoparticles;

the substrate layer comprises a flexible substrate layer;

the first isolation layer comprises SOC; and the second isolation layer comprises SiON.

9. The optical structure according to claim 1, wherein the first conductive portion and the second conductive portion satisfy at least one of:

the first conductive portion has a width in a direction parallel to the substrate layer within 1.5 microns; and the second conductive portion has a width in a direction parallel to the substrate layer within 1.5 microns.

10. The optical structure according to claim 1, wherein the first opening and the third opening satisfy at least one of:

a depth of the first opening is less than a thickness of the first isolation layer; and a depth of the third opening is less than a depth of the third isolation layer.

11. A method for fabricating an optical structure, comprising:

forming a first isolation layer on a substrate layer, wherein the first isolation layer has a first opening on a side away from the substrate layer;

forming a second isolation layer on the first isolation layer, wherein the second isolation layer has a second opening on a side away from the substrate layer, wherein a projection of the first opening on the substrate layer overlaps at least partially with a projection of the second opening on the substrate layer, and wherein a ratio of the refractive index of the first isolation layer to the refractive index of the second isolation layer is in a range of 0.95 to 1.05;

forming, in the second isolation layer, a first conductive layer filling the second opening;

forming a third isolation layer on the second isolation layer, wherein the third isolation layer covers a surface of the first conductive portion away from the substrate layer and has a third opening, and wherein a projection of the third opening on the substrate layer overlaps at least partially with a projection of the fourth opening on the substrate layer;

forming a fourth isolation layer on the third isolation layer, the fourth isolation layer having a fourth opening; and forming a second conductive portion in the fourth isolation layer, wherein the fourth isolation layer is in the fourth isolation layer and fills at least the fourth opening, wherein a first extension direction of the first conductive portion in a plane parallel to the substrate layer differs from a second extension direction of the second conductive portion in the plane parallel to the substrate layer, and wherein a projection of the first conductive portion on the substrate layer overlaps with a projection of the second conductive portion on the substrate layer.

12. The method for manufacturing an optical structure according to claim 11, wherein the ratio of the refractive index of the first isolation layer to the refractive index of the second isolation layer is 1.

13. The method for fabricating an optical structure according to claim 11, wherein forming the first isolation layer and the second isolation layer comprising:

forming a first isolation material layer on the substrate layer;

forming a second isolation material layer on the first isolation material layer;

patterning the first isolation material layer and the second isolation material layer to form the first isolating layer having the first opening and an etched second isolation material layer, wherein the etched second isolation material layer has a retained first sub-part and a first hollowed-out part, a projection of the first hollowed-out part on the substrate layer overlapping with a projection of the first opening on the substrate layer; and growing a second isolation material at least in the first opening to form the second isolation layer.

14. The method for manufacturing an optical structure according to claim 13, wherein growing at least the second isolation material in the first opening comprises using a chemical vapor deposition process to grow the second isolation material.

15. The method for fabricating an optical structure according to claim 11, wherein forming the first isolation layer and the second isolation layer comprises:

forming a first isolation material layer on the substrate layer;

forming a second isolation material layer on the first isolation material layer; and patterning the first isolation material layer and the second isolation material layer to form the first isolation layer having the first opening and the second isolation layer having the second opening.

16. The method for manufacturing an optical structure according to claim 11, wherein forming the third isolation layer and the fourth isolation layer comprises one of:

(i) forming, on the second isolation layer, a third isolation material layer;

forming a fourth isolation material layer on the third isolation material layer;

patterning the third isolation material layer and the fourth isolation material layer to form the third isolation material layer having the third opening and an etched fourth isolation material layer, wherein the etched fourth isolation material layer has a retained second sub-part and a second hollowed-out part, and wherein a projection of the second hollowed-out part on the substrate layer overlaps with a projection of the third opening on the substrate layer; and growing a fourth isolation material at least in the third opening to form the fourth isolation layer;

or (ii) forming a third isolation material layer on the second isolating layer;

forming a fourth isolation material layer on the third isolation material layer; and patterning the third isolation material layer and the fourth isolation material layer to form the third isolation layer having the third opening and the fourth isolation layer having the fourth opening.

17. The method for manufacturing an optical structure according to claim 16, wherein the first opening and the third opening satisfy at least one of:

a depth of the first opening is less than a thickness of the first isolation layer; and a depth of the third opening is less than a depth of the third isolation layer.

18. A method for manufacturing an optical structure according to claim 11, further comprising:

forming a dielectric elastomer on the first conductive portion; and forming nanometallic particles on the second conductive portion.

* * * * *